2 Sheets—Sheet 1.
W. F. SHAW.
Gas Stove.
No. 968.
Reissued May 29, 1860.
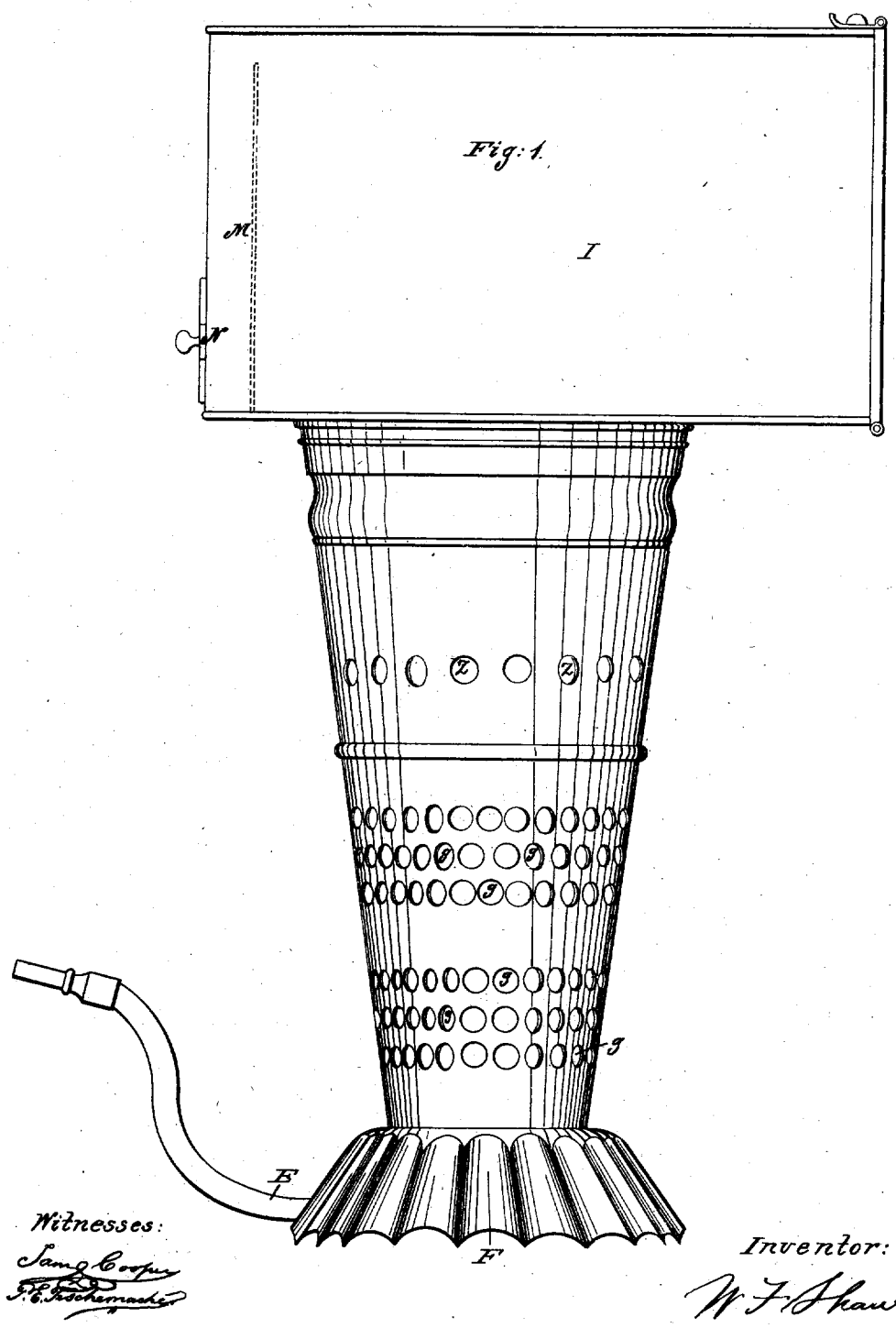
Witnesses:
Sam'l Cooper
J. C. Fischemacher
Inventor:
W. F. Shaw
N. PETERS. Photo-Lithographer, Washington, D. C.

2 Sheets—Sheet 2.
W. F. SHAW.
Gas Stove.
No. 968. Reissued May 29, 1860.
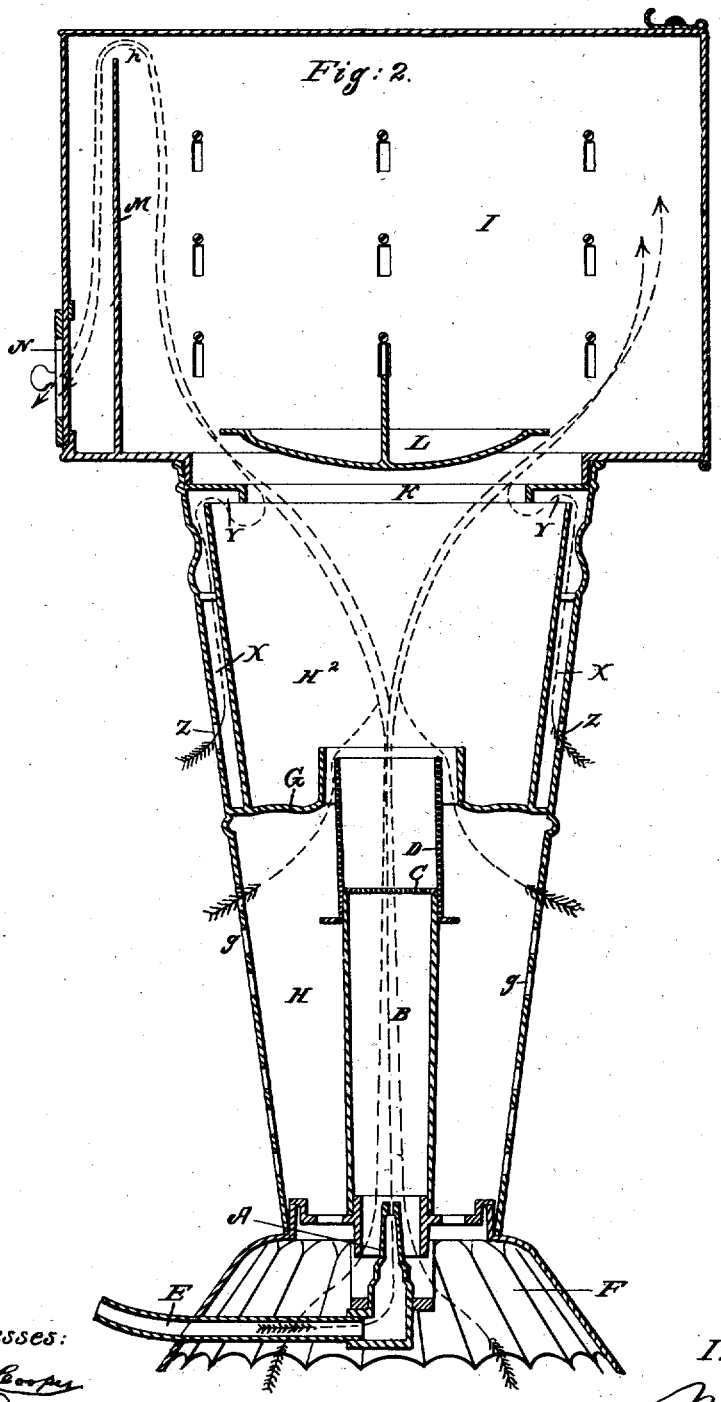
Witnesses:
Sam. Cooper
P. E. Teschemacher
Inventor:
W. F. Shaw.
N. PETERS, Photo-Lithographer, Washington, D. C.

UNITED STATES PATENT OFFICE.

WILLIAM F. SHAW, OF BOSTON, MASSACHUSETTS.

APPARATUS FOR HEATING OR COOKING BY GAS.

Specification forming part of Letters Patent No. 16,031, dated November 4, 1856; Reissue No. 968, dated May 29, 1860.

*To all whom it may concern:*

Be it known that I, WILLIAM F. SHAW, of Boston, in the county of Suffolk and State of Massachusetts, have invented an Improved Apparatus for Heating and Cooking by Gas and Air when commingled and burned; and I hereby declare the same to be a full, clear, and exact description, reference being had to the accompanying drawings, making part of this specification, in which—

Figure 1 is an elevation of a gas-stove with my improvements attached; Fig. 2, a vertical central section through the same.

The burner which I employ is that described in the Letters Patent granted to me on the 26th February, 1856, for improved apparatus for heating by gas. It consists of a tube or conductor, B, open at its lower extremity, A, and having a perforated or wire-gauze top or disseminator, C. Surmounting the burner is a perforated or wire-gauze tube, D, open at its upper extremity. The gas is admitted through the pipe E to the tube B, air being suffered to flow freely from the base F into the lower end of this tube and to ascend with the gas and pass through the disseminator C, upon the upper surface of which and within the tube D the gas is burned, as more particularly described in the before-mentioned Letters Patent. This burner is calculated for the combustion of carbureted-hydrogen gas or for the vapor of hydrocarbons.

In that class of gas cooking-stoves in which the heated gases resulting from the combustion of carbureted hydrogen are thrown directly into the oven in contact with the meats or other articles being cooked, it is found necessary, in order that the flavor and quality of the latter be not injured, that a portion of unaltered atmospheric air be introduced into the oven together with the products of combustion. For this purpose the lower compartment of the stove is furnished with holes or openings *g*, through which air is admitted and allowed to ascend past the burner to the oven. It is manifest, however, that the air thus admitted should be so heated by mixing with the heated gases that the two shall enter the oven at a uniform temperature. For this purpose I have contrived what I term an "external-air concentrator," by which the air which rises from the chamber H is caused to pass in direct contact with the perforated tube D, whereby it is heated and is then mixed with the products of combustion rising from the burner, and this device forms the first part of my invention. This concentrator in the stove represented in the drawings is made of a plate, G, having a hole in its center slightly larger than the tube D, from which rises a short cylinder, *y*, by which the atmospheric air rising from the chamber H is kept in contact with a considerable portion of the perforated tube D. The cylinder *y* may, however, be replaced by a cone, or it may be dispensed with altogether, the plate G′ alone serving to gather in or concentrate the air and throw it upon the tube D. A greater amount of air is thus brought in contact with this tube than could be accomplished were the concentrator dispensed with and the air were allowed to flow freely up into the chamber $H^2$, and a triple end is thus gained. First, the air is heated by coming in contact with the metal of the tube; second, this tube is protected from being injured by the action of the flame or heat within it; third, the air thus heated is caused to enter the chamber $H^2$ in immediate contact with the products of combustion issuing from the tube, whereby the two are ultimately mixed. Where the tube D is dispensed with the concentrator may be placed about one inch above the top of the burner C.

The second part of my invention has for its object to introduce an additional quantity of atmospheric air into the chamber $H^2$ and to raise the temperature of the same by economizing the heat which would otherwise be lost by radiation from the sides of the stove, and to do this by a construction of stove which shall adapt the same stove to use either beneath an oven for baking or beneath kettles or other utensils for boiling, &c. This part of my invention consists in forming the sides of the chamber $H^2$ double, so as to inclose a flue-space, X, which communicates at or near its bottom with the external atmosphere by means of holes or openings Z, and at the top with the chamber $H^2$ by openings Y, made around the circumference immediately beneath the opening K, through which the heated gases pass from the stove to the oven. A current of air is thus established through the openings Z, the passage X, and by the openings Y, which unites with the hot air ascending from the burner and is intimately mixed with it before entering the oven.

It is obvious, if the oven be removed and the stove be employed for boiling, that a passage must be furnished to the products of combustion out from the top of the chamber $H^2$. This passage is supplied by the flue X, and the current passing in a reverse direction in at the openings Y and out at the openings Z is retarded by its passage through the descending flue, so as not to be too rapidly drawn off from beneath the cooking utensil.

Immediately over the chamber $H^2$ is placed the oven I, into which the heated air and the products of combustion pass through the opening K in the top of the stove. Were they allowed to pass directly into the center of the oven the heat would be too great at this point, while it would be deficient around the sides, and the cooking would not be uniform. To remedy this is the object of the third part of my invention, which consists in a deflector or distributing plate, which is arranged immediately over the opening K, by which the ascending current is caused to enter around the sides of the oven, and the whole body of the oven is thus heated to a uniform temperature, as required.

It is evident that the heated products of combustion after they have served their purpose within the oven must be drawn off to give place to a fresh supply from the combustion-chamber; but if the draft through the oven be too rapid, a useless expenditure of heat will result, and I have found that the most economical way of regulating the flow of the heated gases through the oven is by causing them to escape therefrom through a descending passage or flue—and this forms the fourth part of my invention.

In the drawings, M is the descending passage, which receives the heated gases from the upper portion of the oven at *h*, and discharges them at the openings N from the bottom of the passage, the openings N being commanded by suitable doors or slides, whereby the progress of the heat through the oven may be still further regulated.

What I claim as my invention, and desire to secure by Letters Patent, is—

1. The combination of an air and gas burner and an air guide or concentrator, G, operating in the manner substantially as set forth, for the purpose specified.

2. The flue-space X around the chamber $H^2$, with its openings Y and Z, operating as an air-heater when the oven is in place, and as a passage for the escape of the gases when other utensils are employed, as set forth.

W. F. SHAW.

Witnesses:
SAM. COOPER,
P. E. TESCHEMACHER.